(12) United States Patent
Sitt

(10) Patent No.: US 9,009,175 B2
(45) Date of Patent: Apr. 14, 2015

(54) SYSTEM AND METHOD FOR DATABASE MIGRATION AND VALIDATION

(71) Applicant: Simon Sitt, Heidelberg-Pfaffengrund (DE)

(72) Inventor: Simon Sitt, Heidelberg-Pfaffengrund (DE)

(73) Assignee: SAP SE, Walldorf (DE)

( * ) Notice: Subject to any disclaimer, the term of this patent is extended or adjusted under 35 U.S.C. 154(b) by 157 days.

(21) Appl. No.: 13/758,679

(22) Filed: Feb. 4, 2013

(65) Prior Publication Data

US 2014/0222766 A1 Aug. 7, 2014

(51) Int. Cl.
*G06F 17/30* (2006.01)

(52) U.S. Cl.
CPC ........ *G06F 17/30079* (2013.01); *G06F 17/303* (2013.01); *G06F 17/30557* (2013.01); *G06F 17/30595* (2013.01)

(58) Field of Classification Search
CPC .................................................. G06F 17/303
USPC ........................................ 707/756, 809, 810
See application file for complete search history.

(56) References Cited

U.S. PATENT DOCUMENTS

| 8,250,027 B2 * | 8/2012 | Fujiyama et al. ............. 707/602 |
| 2005/0102271 A1 * | 5/2005 | Robertson ........................ 707/2 |
| 2005/0256850 A1 * | 11/2005 | Ma et al. .......................... 707/3 |
| 2008/0195583 A1 * | 8/2008 | Hsu et al. ......................... 707/3 |

OTHER PUBLICATIONS

Hadley et al., Migration check tool—automatic plan veriifcation following treatment management systems upgrade and database migration, Jan. 1, 2013.*

* cited by examiner

*Primary Examiner* — William Spieler
(74) *Attorney, Agent, or Firm* — Kenyon & Kenyon LLP

(57) ABSTRACT

A system and method for database migration and validation is provided. In an embodiment, the database migration and validation system may include a migration framework which analyzes a relational database and its associated access coding and preprocessing/post-processing coding, and based on these analyzes generates an in-memory database, access coding, and database coding in a computer system. The database migration and validation system may also include a validation framework which presents validation queries to the relational database and the in-memory database, compares the results of the queries, and reports the outcome of the comparison.

19 Claims, 4 Drawing Sheets

SYSTEM AND METHOD FOR DATABASE MIGRATION AND VALIDATION

FIELD OF THE INVENTION

This disclosure relates to a system and method for database migration and validation, in particular, a script and coding generator for migration of relational databases to in-memory databases and a validation framework in support of the same.

BACKGROUND

Relational databases are popular tools for organizing relational data for subsequent analysis. However, the data structures generally employed in relational databases are designed to access data infrequently, because this process consumes time and system resources and may create a "bottleneck" for system performance.

Additionally, relational databases may involve large amounts of data and data structures, and require complex coding to present database calls or otherwise query the database, as well as to communicate with user applications. Due to the complexity of the data and the required coding, a large investment of time and labor resources is necessary to create a functional relational database, as well as to validate the data and ensure the coding is operating properly.

Another consequence of this size and complexity is that relational databases and the associated application and coding may become unwieldy. This may create difficulties in moving relational databases between platforms, such as, for example, moving relational databases to platforms based on non-relational databases, or in performing further database or coding development and validation.

Accordingly, there is a need in the art for a faster and more efficient implementation of relational databases and for a cost-effective means to move existing relational databases between platforms.

SUMMARY OF THE INVENTION

In-memory databases provide a solution to these issues. In-memory databases are contained within the main memory of a computer system or other device, which has the advantage of faster data access and faster program execution. In-memory databases also enable real-time operation on a computer or device, or on multiple computers or devices communicating through wired or network connections. An example of an in-memory database is the SAP HANA in-memory database system.

One benefit of an in-memory database in comparison to a relational database is that database coding may be executed directly in the in-memory database, instead of being executed elsewhere, such as an application server or other computing device, for example, thereby avoiding time-consuming communication between the database and the application server or other computing device. This allows an in-memory database to provide faster data access and faster program execution while handling data structures as complex, or more complex, than a relational database. Additionally, instead of optimizing code to reduce the number of data accesses as is common in relational databases, the in-memory database coding may be better adapted to the application at issue.

A copy of the in-memory database may be maintained in secondary storage for non-volatile storage. This is beneficial in that changes to the coding and data structures of the in-memory database may be retained in the event the contents of the main memory are cleared or otherwise lost, such as, for example, when power is no longer provided to a computing device.

However, the conversion from relational databases to in-memory databases has disadvantages. Database coding must be reprogrammed and recoded; for example, coding contained and executed in an application which accesses a relational database may need to be adapted for implementation in an in-memory database, and may be partly located and executed within an in-memory database. Accordingly, the creation of in-memory databases and the coding for in-memory databases requires considerable programming labor and may result in the duplication of previous programming work. In addition, the risk of programming mistakes are increased by the reprogramming and recoding process, and error-checking consumes significant additional time and labor resources.

Embodiments of the present invention provide a system and method to migrate relational databases, or portions thereof, to in-memory databases, and to validate this migration. The system and method may provide for the automatic generation of in-memory database coding and data structures for in-memory databases using the existing relational database coding and data structures, thereby avoiding the labor and time costs of manual reprogramming and recoding. The migration framework may also write data from the relational databases into the in-memory databases. The migration framework may further generate a copy of the in-memory database in secondary storage for non-volatile storage of the in-memory database. Additionally, the system and method may include an automatic validation framework, which compares the output of relational database and in-memory database application calls or queries to detect errors. The validation framework reduces the need for error-checking labor, and allows programming personnel to direct their attention to identified problem areas.

The system and method may be used to migrate and validate relational databases in their entirety to in-memory databases, or to migrate and validate designated portions thereof, depending upon design objectives and user requirements. Complete migration of a relational database to an in-memory database allows for the relational database to be discarded or archived following validation of the in-memory database, and for further development to continue in the in-memory database. Alternatively, if a complete or partial migration of a relational database to an in-memory database is performed, the relational database may be utilized for further development while the in-memory database is available to users. New developments implemented in the relational database can subsequently be integrated into the in-memory database using the migration and validation system.

An additional benefit of this system and method is that the migration from a relational database to an in-memory database, and the subsequent validation, may be performed so that there is no change to user-level application coding. Taking this approach, the application coding and user interfaces operating with the in-memory database will appear and function in the same manner as when operating with the relational database.

Embodiments of the present invention will be described in detail in the exemplary embodiments presented in the drawings and disclosure set forth below.

DETAILED DESCRIPTION

Embodiments of the present invention provide a database migration and validation system including a migration framework which analyzes a relational database and its associated access coding and preprocessing coding, and based on these analyses generates an in-memory database, in-memory access coding, and in-memory database coding for a computer system. The migration and validation system may also include a validation framework which presents validation queries to the relational database and the in-memory database, compares the results of the queries, and reports the outcome of the comparison.

It should be understood that the term coding refers to any computer programming, instructions, processes, and logic. Coding may include software classes as used in object-oriented programming, but the invention is applicable to all database programming implementations.

Figure 1:
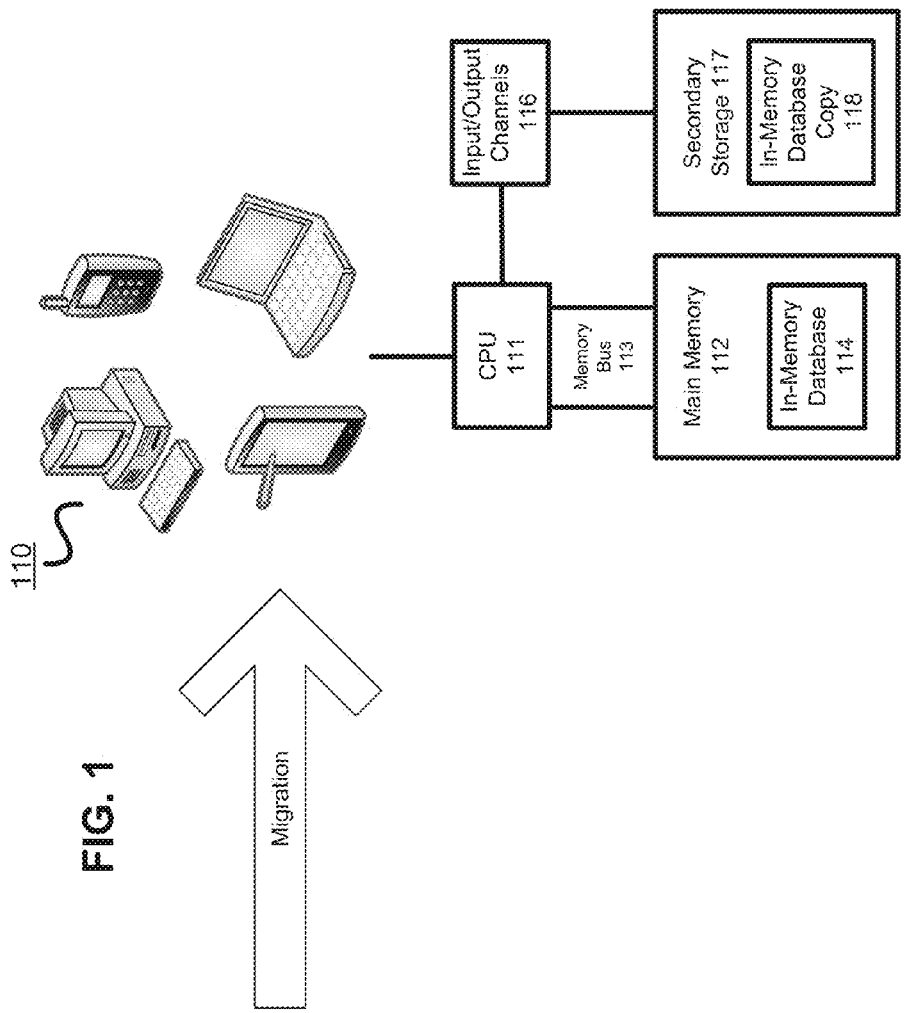
FIG. 1 is a block diagram showing the migration of a computer system containing a relational database to a computer system containing an in-memory database according to an exemplary embodiment.

FIG. 1 illustrates a computer system 100 containing at least one relational database and a computer system 110 including at least one computer or other device containing an in-memory database according to an exemplary embodiment. Computer system 100 includes a computer system having a central processing unit (CPU) 101 and main memory 102 directly accessible to CPU 101 via memory bus 103. The CPU 101 utilizes input/output channels 104 to communicate with secondary storage 105 and tertiary storage 107. Secondary storage 105 may include hard disk drives or other mass data storage devices, and tertiary storage 107 may include including compact discs, flash memory drives, removable hard disk drives, magnetic tape drives, or other removable mass data storage media.

Computer system 100 contains at least one relational database. As shown in FIG. 1, relational database 106 is stored in secondary storage 105, and relational database 108 is stored in tertiary storage 107. However, multiple relational databases can be stored in secondary storage 105 and tertiary storage 107, and FIG. 1 should not be considered as limiting the disclosure in this manner.

One or more of the relational databases contained in secondary storage 106 and one or more of the relational databases stored in tertiary storage 107 may be migrated to computer system 110. Additionally, only selected portions of these relational databases may be migrated. Whether one or more of the relational databases stored in computer system 100 are migrated may be determined based on the design needs and objectives to be accomplished. Furthermore, whether only portions of the relational databases are migrated, or the relational databases are migrated in their entirety, is similarly determined by design needs and objectives.

As illustrated in FIG. 1, the relational databases are migrated to computer system 110. Computer system 110 includes at least one computer or device having a CPU 111 and a main memory 112 directly accessible to CPU 111 via memory bus 113. Computer system 110 further includes a secondary storage 117, in communication with the CPU 111 via input/output channels 116. The at least one computer or device comprising computer system 110 may be a server, a desktop computer, a laptop computer, a tablet computer, a smartphone, a personal digital assistant, a palmtop computer, or other portable computing device, or any combination of these devices. If multiple devices are included in computer system 110, data communication between the devices can be implemented using wired, wireless, or network connections.

Upon completion of migration, the relational databases of computer system 100, or portions thereof, may be contained as in-memory databases in main memory 112 of computer system 110. This is shown in FIG. 1 as in-memory database 114, but this disclosure is not limited to one in-memory database, and multiple in-memory databases may be generated as a result of the migration. The in-memory database may also be copied into secondary storage 117 of computer system 110, as indicated by numeral 118, to allow for non-volatile storage of the in-memory database 114. In-memory database copy 118 may be kept current with updates and other changes made to in-memory database 114. Once the migration is completed, the in-memory database 114 may be accessed by the computer system 110 or any other device in wired, wireless, or network communication with the computer system 110.

Figure 2A:
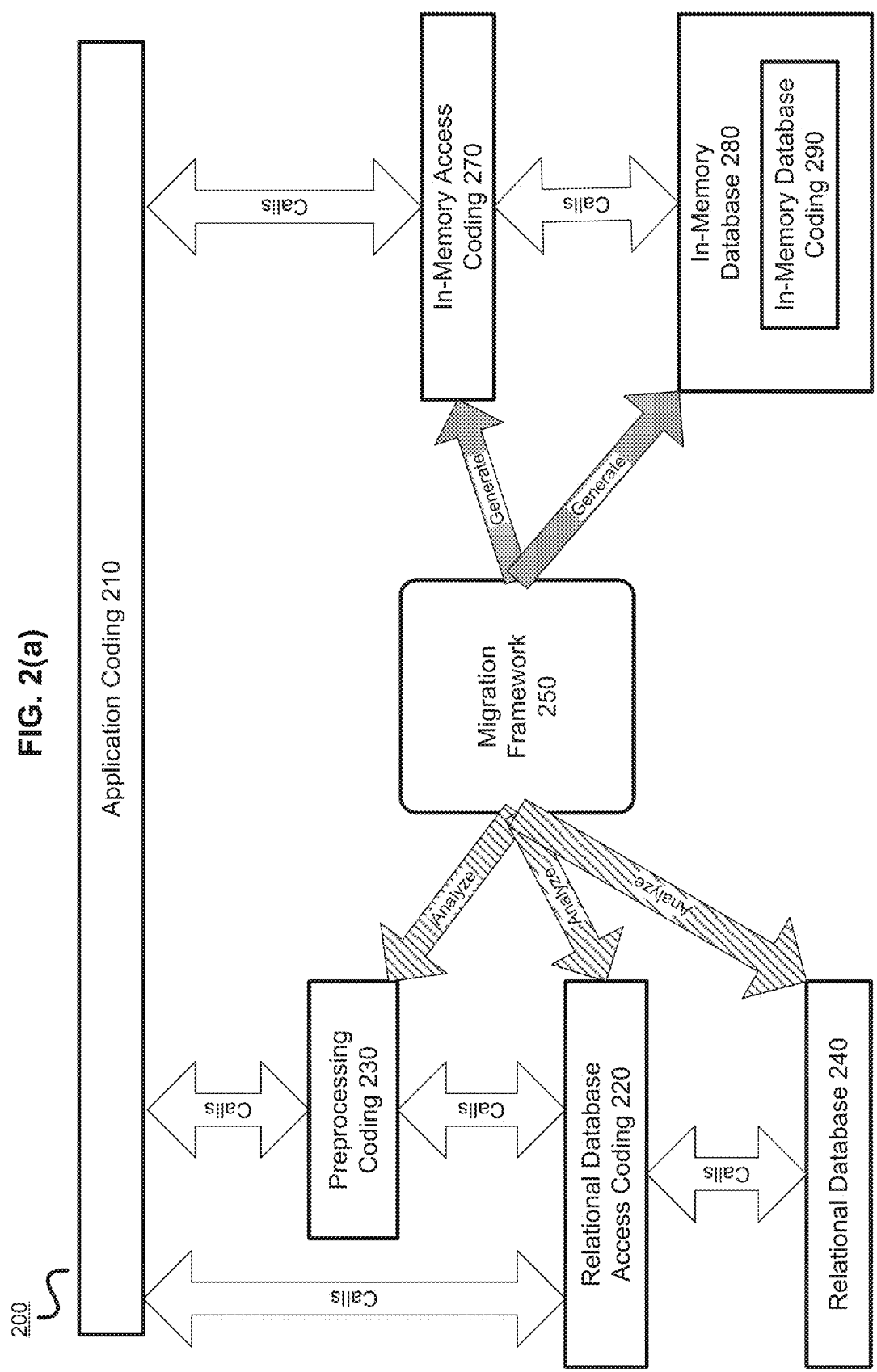
FIG. 2(a) is a block diagram showing a migration framework operating between a relational database and an in-memory database according to an exemplary embodiment.

FIG. 2(a) is a block diagram showing the migration framework that operates to migrate a relational database and generate an in-memory database according to an exemplary embodiment.

Application coding 210 is illustrated in FIG. 2(a). This coding may form the basis of the application employed by the user to query or otherwise engage with relational database 240. The application coding 210 may be designed to interact with the relational database 240 based on input or instructions received from the user by calling the relational database access coding 220 and/or the preprocessing coding 230, if necessary.

The relational database access coding 220 may be coded to read and write to the relational database 240, and to make calls to and receive calls from the application coding 210 and the relational database 240. In addition, relational database access coding 220 may contain coding that reflects the relationships between different data structures, such as between two or more data tables. Database access coding 220 may contain relational connection information between data structures and allow access to this information, or may contain relational connection information between multiple relational databases. Relational database access coding 220 may contain a large amount of programming, instructions, processes, and logic and may require extensive validation to ensure proper operation.

FIG. 2(a) also illustrates preprocessing coding 230, which address data consistency and organizational issues. For example, when raw data is provided by a user or imported from other data sources, the raw data may be in a certain format, such as a unit of measure or currency, but data of this type may be stored in the relational database 240 in a different format. In this case, the raw data cannot be directly entered into the relational database 240, and preprocessing coding 230 may be called to convert the raw data into a format acceptable for entry and for subsequent analysis. Additionally, the preprocessing coding 230 may be needed following data entry and analysis, or after execution of a query, so that the data returned to the application coding 210 is in an acceptable format. Calls to the preprocessing coding 230 may be made by the application coding 210 and the relational database access coding 220, and calls may be made to these coding by the preprocessing coding 230. Preprocessing coding 230 may also perform data transformation operations, including removing data regarding relations between variables in the raw data, to place the raw data into a more suitable form for the relational database 240. Like the relational database access coding 220, preprocessing coding 230 may contain a large amount of programming, instructions, processes, and logic and may require extensive validation.

In order to implement the relational database 240 as an in-memory database, migration framework 250 is employed. As shown in FIG. 2(a), migration framework 250 analyzes the relational database access coding 220 and the preprocessing coding 230. Prior to the migration, the specific relational databases access coding 220 and the specific preprocessing coding 230 may be been identified to the migration framework 250, and the analysis performed by migration framework 250 may include static and dynamic analyses. For example, the analysis performed by the migration framework 250 may include statically analyzing the relational database 240 and the data structures contained therein, the relational database access coding 220, and the preprocessing coding 230. The analysis performed by the migration framework 250 may also include analyzing calls made to the relational database 240 by the relational database access coding 220, calls received by the relational database access coding 220 from the relational database 240, and reading and writing to the relational database 240 by the relational database access coding 220. The analysis may further include calls made by and received from the relational database access coding 220 to the application coding 210. The migration framework 250 may also analyze the data formatting and transformation performed by the preprocessing coding 230.

Based on this analysis, the migration framework 250 may generate programming, instructions, processes, and logic for the in-memory database. Coding for the in-memory database may include access coding executed outside of the in-memory database on, for example, an application server or other computing device, and database coding, which is executed in the in-memory database.

As shown in FIG. 2(a) the migration framework 250 may generate in-memory access coding 270 and in-memory database coding 290 for use with the in-memory database 280. The migration framework 250 converts the programming, instructions, processes, and logic of the relational database access coding 220 and the preprocessing coding 230 into programming, instructions, processes, and logic for the in-memory access coding 270 and the in-memory database coding 290 that is appropriate for an in-memory database. The migration framework also copies the relational database 240 by creating the data structures of the in-memory database 280 and writing the data contained in the relational database 240 into the in-memory database 280. Additionally, the migration framework 250 may copy the in-memory database 280 into a secondary storage device, for non-volatile retention.

The migration framework assigns the functions of the relational database access coding 220 and the relational database preprocessing coding 230 between the in-memory access coding 270 and the in-memory database coding 290. For example, the functions of the relational database access coding 220 may be contained entirely within the in-memory access coding 270, and the functions of the preprocessing coding 230 may be contained entirely within the in-memory database coding 290. Alternatively, the functions of the relational database access coding 220 may be contained partly in the in-memory access coding 270, with other functions remaining accessible for calling within the relational database access coding 220. These assignments may be made in any number of variations as required by design needs, efficiency, or other considerations.

The migration framework 250 is not limited to the migration of a single relational database to a single in-memory database. Multiple relational databases, stored in secondary memory, tertiary memory, or other memory may be migrated. Further, migration framework 250 is not limited to creating a single in-memory database, and may generate multiple in-memory databases during the migration of one or more relational databases. It may be beneficial, however, to consolidate the programming, instructions, processes, and logic from multiple relational database access coding and preprocessing coding into the in-memory access coding and the in-memory database coding.

The migration framework 250 can be managed by a technology professional, consultant, or other person with sufficient knowledge to configure the framework for the task at hand. For example, it may be desired to minimize the volume of data storage, or conversely it may be desired to store data redundantly. Additionally, when migrating multiple relational databases, it may be desired to create separate in-memory data databases or data structures for each relational database, to consolidate the relational databases into a single database or data structure, or to otherwise segregate the relational databases into multiple in-memory databases or data structures. The operation of the migration framework may also be configured in view of other constraints that may arise. In view of the faster data access capabilities of in-memory databases and depending on design needs, it may not be necessary for the migration framework to optimize the data structure of the in-memory database 280 to reduce instances where data access is needed.

Once the migration framework 250 completes the migration and the in-memory access coding 270, the in-memory database 280, and the in-memory database coding 290 have been generated, and data from the relational database 240 has been written into the in-memory database 280, a validation process must be performed. In view of the amount and complexity of programming, instructions, processes, and logic necessary for the relational database coding and the in-memory access coding and in-memory database coding, this can be a difficult and labor-intensive endeavor if performed manually.

Figure 2B:
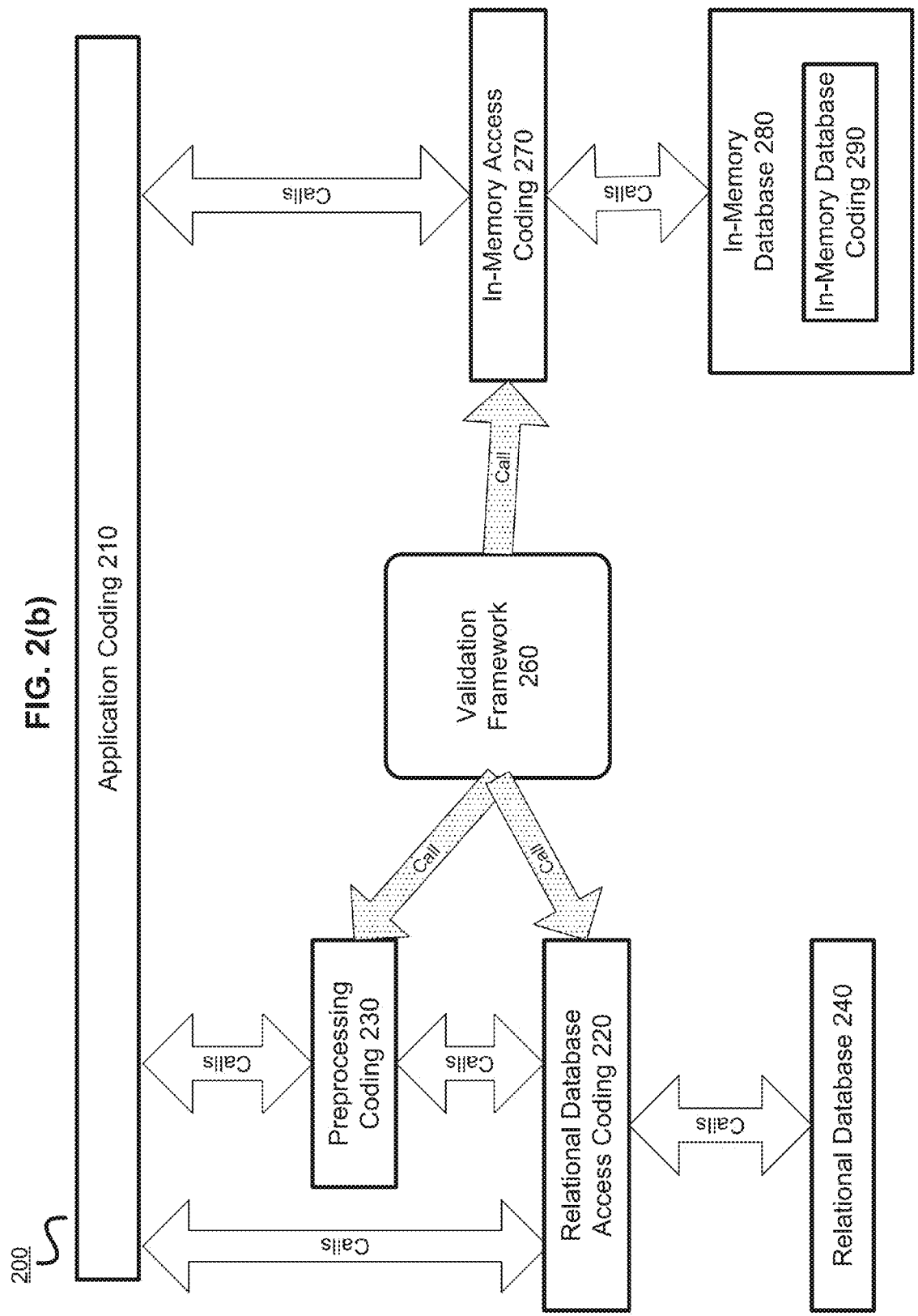
FIG. 2(b) is a block diagram showing a validation framework operating after the migration of the relational database to the in-memory database of FIG. 2(a) is completed according to an exemplary embodiment.

FIG. 2(b) is a block diagram showing the validation framework 260 operating after the migration of relational database 240 to in-memory database 280 by migration framework 250 according to an example embodiment. Given the volume and complexity of coding and data structures that may be present, the validation framework 260 may be configured to validate the migration automatically. This may be accomplished by presenting the same query to both relational database 240 and in-memory database 280 and comparing the result. In order for the migration to be successful, the same result for both queries should be returned to the validation framework 260.

For example, a validation query may be provided to the validation framework 260 by technology personnel in advance of the migration, or once the migration is completed. As shown in FIG. 2(b), upon receiving this instruction, the validation framework 260 queries the relational database 240 by calling relational database access coding 220, and also calling preprocessing coding 230, if necessary. Additionally, the validation framework 260 presents the same query to the in-memory database 280, by calling the in-memory access coding 270, which executes the query and calls the in-memory database coding 290, if necessary.

Upon receiving the result of each query, the validation framework 260 performs a comparison to determine if the same result has been returned by the relational database 240 and the in-memory database 280. Return of the same results by both the relational database 240 and the in-memory database 280 may indicate that both databases are operating in the same manner and that the migration has been correctly performed, and the validation framework 260 may send a confirmation message indicating that the query has been answered successfully. However, if the results do not match, the validation framework 260 may alert technology personnel of a potential problem with the migration, or send an error message for recordation and subsequent review. It may be helpful for technology personnel to provide names, numbers, or other identifiers for the validation queries, or for the coding or data structures implicated in the validation queries, to facilitate recognition of potential problem areas.

The validation framework 260 may not be limited to a single validation query. Instead, a number of validation queries may be initiated, depending on the data stored in the relational database 240 and the functionality of the relational database access coding 220 and the preprocessing coding 230. The data stored in the in-memory database 280 and the functionality of the in-memory access coding 270 and in-memory database coding 290 may also be considered in preparing validation queries. The validation framework 260 may perform as many queries and result comparisons as required to ensure the migration has been successful.

The automatic validation querying and result comparison performed by the validation framework 260 may provide considerable time and resource savings versus manual validation. Additionally, the results of unsuccessful validation queries may guide technology personnel in recognizing potential problem areas, and allow such personnel to focus on potential problem areas.

Another potential benefit of this approach is that the application coding 210 may remain unchanged. The application coding 210 calls the relational database access coding 220 and the preprocessing coding 230 in order to query the relational database 240, and during migration the migration framework 250 may configure the in-memory access coding 270 and in-memory database coding 290 to be operable with the existing code contained in the application coding 210. In addition to conserving time and programming resources, this may allow users to maintain continuity and familiarity with the existing application coding 210.

Figure 3:
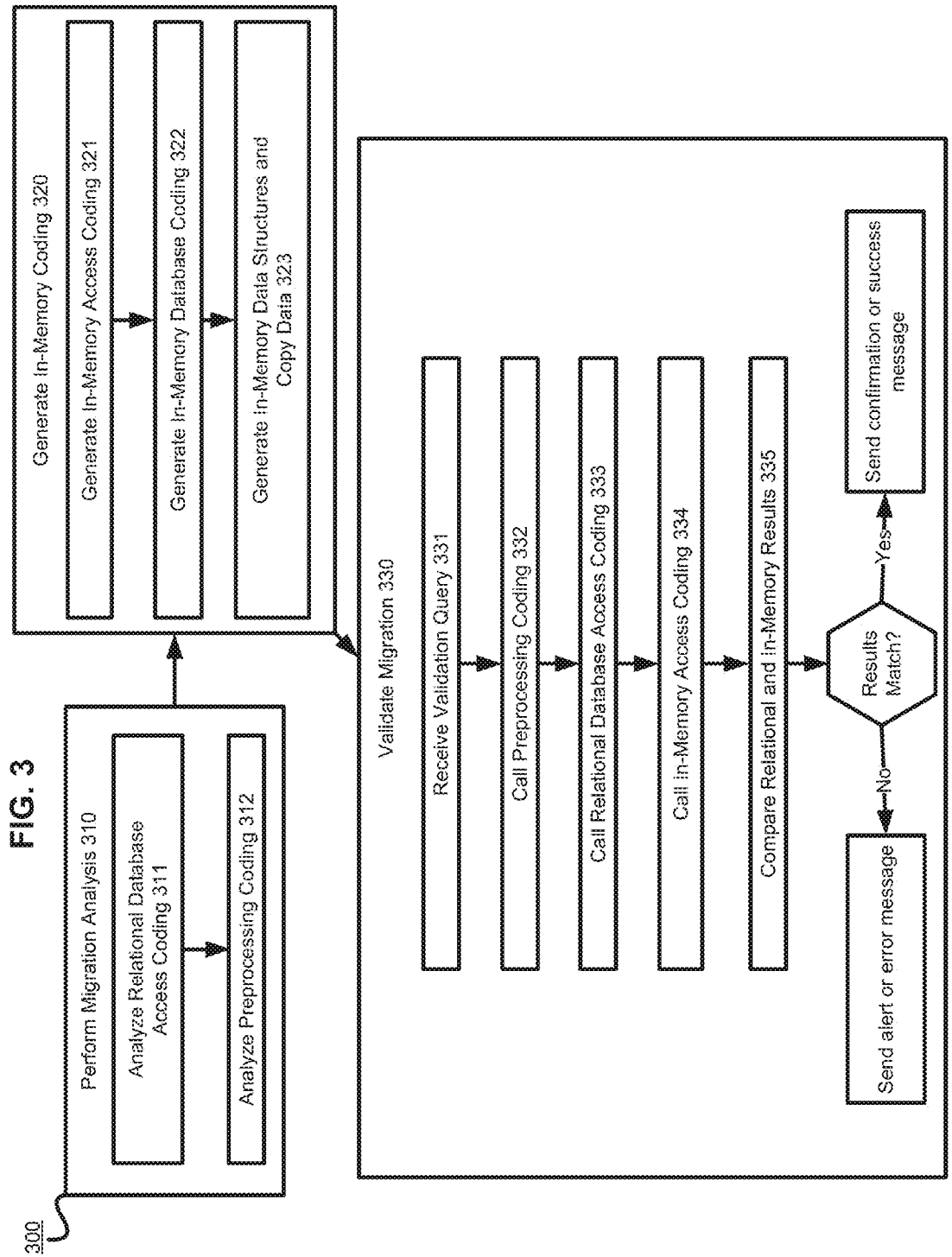
FIG. 3 is a flow chart of a method for the migration of a relational database to an in-memory database and the validation of this migration according to an exemplary embodiment.

FIG. 3 is a flow chart of a method for migration and validation 300 of a relational database to an in-memory database according to an exemplary embodiment.

Once the migration framework has been configured and initiated, the first task is to perform the migration analysis, shown as block 310 in FIG. 3. The migration framework performs this task in two steps, analyzing the relational database access coding (311) and analyzing the preprocessing coding (312), and these steps may includes static and dynamic analyses. As an example, the migration framework may perform a static analysis of the relational database, the relational database access coding, and the preprocessing coding. The migration framework may further analyze relational database access coding calls to and from the relational database and the application coding, relational database access coding reading and writing to the relational database, and data formatting and transformation performed by the preprocessing coding. These tasks need not be performed in the order shown in FIG. 3, and instead the migration framework may analyze the preprocessing coding prior to analyzing the relational database access coding, or these analyses may be performed simultaneously. The order may be determined by technology personnel as required by efficiency considerations or design needs.

Next, the migration framework may generate in-memory coding (320). Using the results of the analyses shown in steps 311 and 312, the migration framework may generate in-memory access coding (321) and may generate in-memory database coding (322), in order to replicate the functionality of the relational database access coding and the preprocessing coding for the in-memory database. As with the steps 311 and 312, the steps of generating in-memory access coding (321) and generating in-memory database coding (322) may be performed in any order, or simultaneously. The migration framework also generates the data structures for the in-memory database and copies the data from the relational database into the in-memory database (323).

Once the in-memory access coding, in-memory database coding, in-memory database data structures and the data contained in the in-memory database are generated, the process of validating the migration (330) may begin. First, the validation framework receives a validation query, instruction, or request (331). The validation query may be provided prior to the performance of the migration, or may be supplied after the migration has been completed. Validation may be conducted immediately upon completion of the migration process, or at a later time; however, it is desirable that all necessary validation be completed prior to use of the in-memory database.

The next step in migration validation process 330 is for the migration framework to call the preprocessing coding of the relational database (332) and, if necessary, call the preprocessing coding (333), according to the validation query. The validation framework also presents the validation query to the in-memory database by calling in-memory access coding (334), which executes the query and may call the in-memory database coding, if needed. The validation framework may then compare the result of the validation query provided by the relational database to the results of the validation query provided by the in-memory database (335). If both results match, it may be indicative of a successful migration in that the relational database and the in-memory database are functioning in the same manner. The validation framework may then send a confirmation message indicating that the query has been performed successfully. Receipt of results that do not match may indicate that the migration has not been performed correctly, and the validation framework sends an error message or otherwise alerts technology personnel. The error message supplies guidance to direct technology personnel to potential problems areas for review, and may include identifiers for the coding or data structures involved in the validation query. The validation process 330 may be repeated for multiple validation queries.

The migration and validation method 300 is not limited to migrating one relational database to one in-memory database. One or multiple relational databases, or specific portions thereof, may be migrated to separate in-memory databases, consolidated into one in-memory database, or segregated into multiple in-memory databases. Regardless of the number of relational and in-memory databases involved in the migration process, it may be desirable to execute as many validation queries as required to test and validate all of the in-memory database functionality.

Once the migration and validation process is complete, many benefits of in-memory databases may be realized. For example, in-memory databases may deliver increased data access speed compared to relational databases stored outside of main memory, and consequently may provide faster program execution. Real-time program execution may also be implemented due to the increased speed of program execution. In-memory databases may also be accessed from desktop computers or portable devices such as laptop or tablet computers and smartphones, which may be placed in data communication using wired, wireless, or network connections.

It should be understood that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principals disclosed and claimed herein.

What is claimed is:

1. A database migration and validation system contained within a first computing device including a processor, a main memory, and a secondary storage device, comprising:
   a relational database stored in the secondary storage device;
   relational database access coding to call the relational database, read and write to the relational database, and receive calls from the relational database;
   a migration framework to analyze the relational database access coding, including calls made by and to the relational database access coding and reading and writing performed by the relational database access coding, to analyze the data structures of the relational database, and to generate an in-memory database; and
   a validation framework to test the in-memory database generated by the migration framework;
   wherein the migration framework is to write the relational database into a second computing device to generate the in-memory database, the second computing device including at least a processor and a main memory;
   the migration framework is to generate in-memory access coding and in-memory database coding;
   the migration framework is to generate data structures of the in-memory database and write data from the relational database into the in-memory database;
   the validation framework is to query the relational database by calling the relational database access coding and query the in-memory database by calling the in-memory access coding; and
   the validation framework is to compare the results of the queries and report the outcome of the comparison.

2. The database migration and validation system of claim 1, further comprising preprocessing coding to format and transform data for entry into the relational database;
   wherein the migration framework analyzes the data formatting and transformation performed by the preprocessing coding.

3. The database migration and validation system of claim 1, further comprising application coding having a user interface and configured to call the relational database access coding and the in-memory access coding.

4. The database migration and validation system of claim 3, wherein the application coding is not changed by the migration framework.

5. The database migration and validation system of claim 1, wherein the second computing device is a portable computing device.

6. The database migration and validation system of claim 1, wherein the migration framework analyzes multiple relational databases and the relational database access coding for multiple relational databases.

7. The database migration and validation system of claim 6, wherein the migration framework consolidates multiple relational databases into one in-memory database.

8. The database migration and validation system of claim 6, wherein the migration framework generates multiple in-memory databases.

9. The database migration and validation system of claim 1, wherein the migration framework analyzes a predetermined portion of the relational database and relational database access coding.

10. The database migration and validation system of claim 1, wherein the second computing device further comprises a secondary storage device, and the migration framework generates a copy of the in-memory database in the secondary storage device of the second computing device.

11. The database migration and validation system of claim 1, wherein the validation framework presents multiple queries to the relational database and the in-memory database.

12. The database migration and validation system of claim 1, wherein the validation framework reports the outcome of the comparison by transmitting a message containing identification information regarding at least one of the relational database access coding, the in-memory access coding, and the in-memory database coding.

13. A method for database migration and validation, comprising the steps of:
   analyzing relational database access coding by a migration framework;
   writing a relational database into an in-memory database by the migration framework;
   generating an in-memory access coding and in-memory database coding by the migration framework based on the analysis of the relational database access coding;
   generating data structures for the in-memory database and writing data from the relational database into the in-memory database by the migration framework;
   querying the relational database and the in-memory database by a validation framework that calls the relational database access coding and the in-memory database access coding;
   comparing the results received from the relational database and the in-memory database by the validation framework; and
   reporting the outcome of the comparison by the validation framework.

14. The method for database migration and validation of claim 13, further comprising the step of analyzing preprocessing coding relating to the relational database.

15. The method for database migration and validation of claim 13, wherein the migration framework analyzes multiple relational databases and the relational database access coding for multiple relational databases.

16. The method for database migration and validation of claim 13 wherein the migration framework analyzes a predetermined portion of the relational database and relational database access coding.

17. The method for database migration and validation of claim 13, wherein
   the validation framework presents multiple queries to the relational database and the in-memory database;
   the validation framework compares the results of the queries; and the validation framework reports the results of each comparison by transmitting a message containing identification information regarding at least one of the relational database access coding, the in-memory access coding, and the in-memory database coding.

18. The method for database migration and validation of claim 13, wherein the in-memory database, the in-memory access coding, and the in-memory database coding are generated in a portable computing device separate from the device containing the relational database and relational database access coding.

19. A database migration and validation system, comprising:
- a first computer system including a processor, a main memory, and a secondary storage device, the secondary storage device containing a first relational database, first relational database access coding, and first preprocessing coding, and further containing a second relational database, second relational database access coding, and second preprocessing coding;
- wherein the first relational database access coding makes calls to, receives calls from, and reads and writes to the first relational database, and the first preprocessing coding formats and transforms data for entry into the first relational database; and
- the second relational database access coding makes calls to, receives calls from, and reads and writes to the second relational database, and the second preprocessing coding formats and transforms data for entry into the second relational database;
- a second computer system including a processor, a main memory, and a secondary storage device;
- a migration framework to analyze the first and second relational database access coding and the first and second preprocessing coding, and generate an in-memory database; and
- a validation framework to test the in-memory database generated by the migration framework;
- wherein the migration framework analyzes the first and second relational databases, the calls made by and received by the first and second relational database access coding, the reading and writing performed by the first and second relational database access coding, and the data formatting and transformation performed by the first and second preprocessing coding, and generates an in-memory database, in-memory access coding, and in-memory database coding in the second computer system;
- the generation of an in-memory database by the migration framework includes generating data structures for the in-memory database and writing data from the relational database into the in-memory database;
- the migration framework generates a copy of the in-memory database in the secondary storage device of the second computer system;
- the validation framework presents a set of queries to the first and second relational databases by calling the first and second relational database access coding and first and second preprocessing coding, and presents the set of queries to the in-memory database by calling the in-memory access coding;
- the validation framework compares the result of each query received from the first and second relational databases to the result received from each query received from the in-memory database, and reports the outcome of each comparison; and
- the second computer system is separate from the first computer system.

* * * * *